United States Patent
Zhang et al.

(10) Patent No.: US 12,459,664 B2
(45) Date of Patent: Nov. 4, 2025

(54) DETERMINING A LOAD CONDITION OF AN AIRCRAFT

(71) Applicant: AIRBUS OPERATIONS LIMITED, Bristol (GB)

(72) Inventors: Junwei Zhang, Bristol (GB); Daniel Farid Asadi-Aghdam, Bristol (GB); Martin Youings, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 161 days.

(21) Appl. No.: 18/126,913

(22) Filed: Mar. 27, 2023

(65) Prior Publication Data
US 2023/0322404 A1      Oct. 12, 2023

(30) Foreign Application Priority Data
Mar. 28, 2022   (GB) ..................... 2204382

(51) Int. Cl.
*B64D 45/00*      (2006.01)

(52) U.S. Cl.
CPC .................... *B64D 45/00* (2013.01)

(58) Field of Classification Search
CPC .... B64D 45/00; B64D 45/0005; G01G 19/07; G01M 1/125; B64C 25/58
See application file for complete search history.

(56) References Cited

U.S. PATENT DOCUMENTS

| | | |
|---|---|---|
| 10,859,431 B2 | 12/2020 | Nance |
| 2006/0220918 A1 | 10/2006 | Stockwell et al. |
| 2010/0121560 A1 | 5/2010 | Vetsch |
| 2016/0195447 A1 | 7/2016 | Nance |
| 2018/0216988 A1 | 8/2018 | Nance |
| 2019/0344904 A1 | 11/2019 | Stein |
| 2019/0385174 A1 | 12/2019 | Nance |
| 2020/0070960 A1 | 3/2020 | Parker et al. |

FOREIGN PATENT DOCUMENTS

| | | |
|---|---|---|
| CA | 2 665 963 | 11/2010 |
| CN | 208 863 020 U | 5/2019 |
| CN | 214356649 | 10/2021 |

OTHER PUBLICATIONS

Combined Search and Examination Report for GB2204382.2, dated Sep. 27, 2022, 5 pages.
Anonymous: CIPOS technology HELLA, Retrieved from the Internet Aug. 24, 2023 <URL:https://www.hella.com/soe/en/News/CIPOS-technology-4164/>, pp. 1-13, dated Jul. 9, 2021.
Extended European Search Report for Application No. EP 23160591.6, nine pages, dated Sep. 1, 2023.

*Primary Examiner* — Justin S Lee
(74) *Attorney, Agent, or Firm* — Nixon & Vanderhye P.C.

(57) ABSTRACT

Disclosed are methods and devices for determining a load condition of an aircraft. A sensing device is mountable relative to an aircraft strut during loading operations and demountable after loading operations. A data processing device is operable to process output from the sensing device together with aircraft specific data, to determine a load condition of the aircraft.

18 Claims, 6 Drawing Sheets

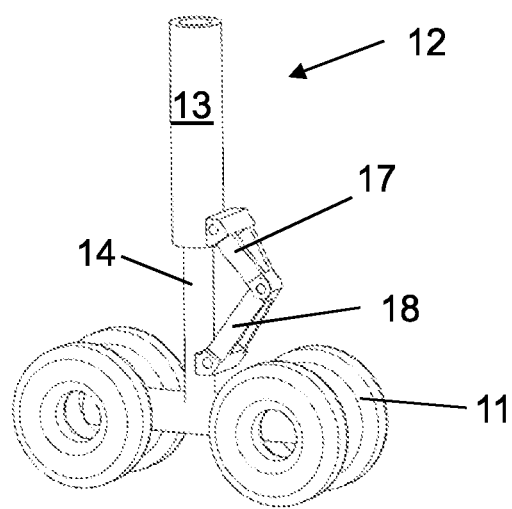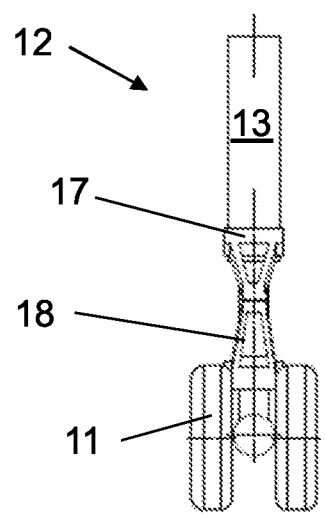
Fig 2
Fig 3

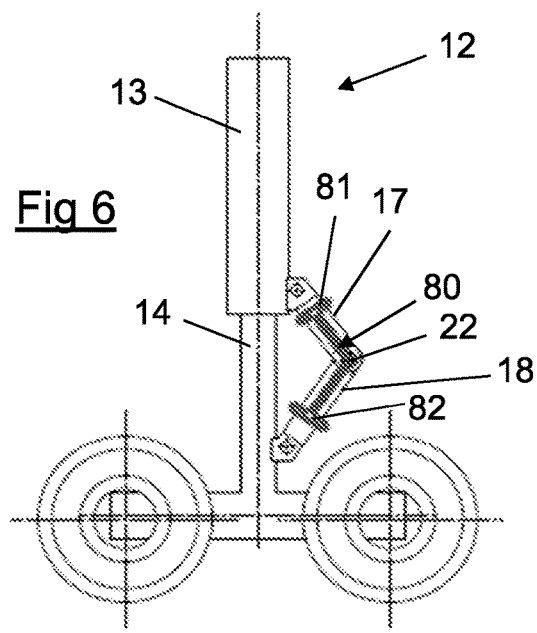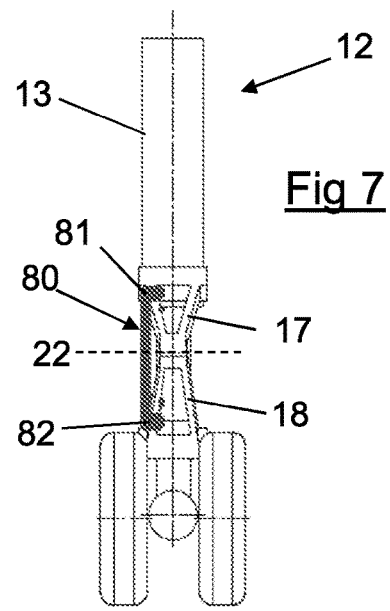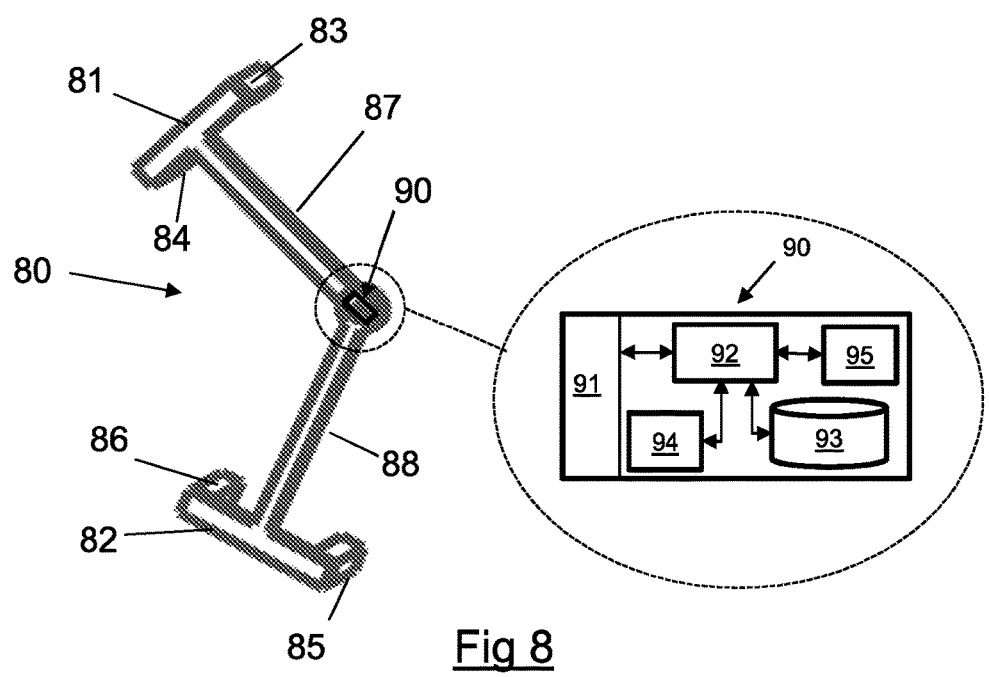

DETERMINING A LOAD CONDITION OF AN AIRCRAFT

CROSS RELATED APPLICATION

This application claims priority to United Kingdom Patent Application GB 2204382.2, filed Mar. 28, 2022, the entire contents of which is hereby incorporated by reference.

BACKGROUND OF THE INVENTION

The present invention relates to methods and devices for determining a load condition of an aircraft. More particularly, but not exclusively, this invention concerns a sensing device mountable relative to an aircraft strut during loading operations and demountable after loading operations. The invention also concerns a data processing device operable to process output from the sensing device together with aircraft specific data to determine a load condition of an aircraft, and a method of determining a load condition of an aircraft.

It is important for efficiency, safety, and regulatory considerations that aircraft operators can estimate or measure with sufficient accuracy the weight and/or weight distribution of an aircraft during loading operations and/or when loaded prior to departure. For example, the position of an aircraft's centre of gravity should not move aft past a tail tip point during loading operations, and for safe flight control should be maintained within a predetermined range of positions relative to the centre of lift or mean aerodynamic chord for the aircraft type and operational weight. The total aircraft weight should not exceed the allowable maximum gross weight for the aircraft type and the planned operations.

Placing aircraft on weighing scales is time consuming and expensive, and is not generally used for measuring loaded aircraft weight and weight distribution during commercial operations, for example.

On aircraft weight and balance systems for dynamically determining aircraft weight and balance are known. For example, US2019/0344904A1, US2019/0385174A1, CA2665963A1, US2010/0121560A1 and US2020/0070960A1 all disclose on aircraft sensing systems relating to aircraft weight and/or balance. Such systems require precision sensors and other components and are time consuming and expensive to develop and install, including the expense and delay of removing from service if retrofitting to an in service aircraft. Furthermore, such sensors and components, for example those installed on or adjacent landing gear, may be exposed to damage especially during take-off and landing.

Many aircraft do not have an on aircraft weight and balance system. Some current methods of estimating aircraft weight and balance rely on gathering information from manifests and/or planning where passengers and/or cargo will be placed on an aircraft. However, such methods can result in inaccurate weight and balance calculations and/or are prone to changes to a planned loading scheme during loading operations that may go unnoticed.

The present invention seeks to mitigate or overcome at least one of the above-mentioned problems. Alternatively or additionally, the present invention seeks to provide an improved sensing device, data processing device and/or method for determining a load condition of an aircraft.

SUMMARY OF THE INVENTION

The present invention provides a sensing device comprising a sensor operable to sense a characteristic related to a length of a strut of a landing gear of an aircraft, the device being mountable relative to the strut during loading operations, for example being configured to be mounted to the landing gear in a predetermined positional and/or configurational relationship with the strut, and demountable after loading operations prior to the aircraft moving from the loading operations position, the sensing device being operable to provide an output relating to the sensed characteristic for receipt by a data processing device operable to use the received output to determine a load condition (e.g. the weight supported by the landing gear) of the aircraft during loading operations.

Embodiments of the invention are relatively cost effective and convenient since no expensive and time consuming development and modifications of landing gear are necessary, nor any installation of complex parts and systems, in order to obtain the required sensor readings. Furthermore, the devices of various embodiments are not liable to be exposed to in-flight damage, and do not impact the existing flight configuration. Still further, access to devices of the embodiments for ground operations personnel to operate and to maintain is fast and convenient, and such devices in some embodiments are easily portable and stowable, for example to travel aboard a specific aircraft.

Loading operations as used herein includes all activities that change the load balance on an aircraft, for example loading, unloading or changing the position on the aircraft of a load such as cargo and/or passengers. Output as used herein, for example in relation to output from various sensors, means an output signal, the output for example comprising an analogue signal, optionally pre-processed, or a digital signal for example provided by a processor associated with a sensor.

Preferably, the sensing device comprises a further sensor for sensing temperature at or adjacent the strut, the sensing device operable to provide a further output relating to the sensed temperature for receipt by the data processing device. The provision of strut temperature information facilitates improved accuracy of load determination in some embodiments. The sensing device may comprise a processor and a memory, the processor being in communication with the or each sensor and the memory, the processor being operable to receive data from the or each sensor and to store the received data in the memory. The sensing device may also comprise a communications interface for communicating sensed output to the data processing device, the communications interface preferably comprising a wireless data interface. In some embodiments, this facilitates fast, reliable and safe operational set up of a load determination arrangement during ground operations.

It may be that the landing gear includes a link mechanism, for example having one or more link arms or other members, which rotate about a pivot axis as the length of the strut of the landing gear changes. It may be that the characteristic sensed by the sensor related to the length of the strut is a characteristic related to the angle of rotation of a part of such a link mechanism.

In one embodiment, the sensor is operable to sense an angle between first and second link arms of a link mechanism of the landing gear about a common pivot axis, the sensing device comprising first and second pivotally interconnected members, respective mount portions of the members being adapted to be removably mountable to the link mechanism so as to align a pivot axis of the sensing device with the common pivot axis of the first and second arms. The sensing device may comprise first and second members pivotally interconnected at end portions thereof, respective opposite end portions of the members comprising respective quick release mount portions for removably mounting the members directly to respective link arms of the link mechanism.

In another embodiment, the sensor is operable to sense an angle between i) a first and/or second link arm of a link mechanism of the landing gear and ii) a longitudinal axis of the strut, the sensing device comprising first and second pivotally interconnected members, respective mount portions of the members being adapted to be removably mountable respectively to i) the first or second link arm and ii) to the strut, so as to align a pivot axis of the sensing device with a pivot axis of the first or second link arm relative to the strut. The sensing device may comprise first and second members pivotally interconnected at end portions thereof, wherein respective opposite end portions of the members comprise respective quick release mount portions for removably mounting the members respectively i) to the first or second link arm and ii) relative to a cylinder or piston of the strut.

In an alternative embodiment, the sensing device is operable to directly sense a longitudinal distance between a first location fixed for movement relative to a strut cylinder and a second location fixed for movement relative to a strut piston.

The sensing device may comprise at least one of a rotary transducer, linear transducer, optical sensor.

In embodiments, the sensing device includes a mounting mechanism that facilitates the mounting of the sensing device to the strut and the demounting of the sensing device from the strut. For example, a mount portion may be adapted to locate in a specific position on the first and/or second link arm by resiliently gripping the link arm, and/or by being magnetically attracted to the link arm, and/or by including a mounting strap or other quick release mechanism. Many suitable alternative forms of mount portion will be apparent to the ordinarily skilled person.

The load condition may relate to (e.g. be equal to, or dependent on) a load on the landing gear, for example the weight supported by the landing gear. Alternatively or additionally, the load condition may relate to the total weight on wheels of the aircraft. Alternatively or additionally, the load condition may relate to the centre of gravity, which may move during loading/unloading of an aircraft. For example, the load condition may relate to the position of the centre of gravity and/or the speed and/or the direction of travel of the centre of gravity of the aircraft, and/or the rate of change of speed and/or direction of travel of the centre of gravity.

The present invention also provides a sensing device as described above, when used i) to sense a characteristic related to a length of a strut of a landing gear of an aircraft, while mounted relative to the strut during loading operations, for example in a predetermined positional and/or configurational relationship with the strut, and ii) to provide an output relating to the sensed characteristic, to thereby enable a data processing device to use the received output to determine a load condition (e.g. the weight supported by the landing gear) of the aircraft during loading operations, the sensing device being adapted to be demounted after loading operations prior to the aircraft moving from the loading operations position.

In a further aspect, the invention provides a data processing device comprising a processor and a memory, the device operable to:
 a. receive output relating to the length of a strut of at least one aircraft landing gear from, at least one respective sensing device mountable and demountable relative to the or each strut during ground operations; and
 b. process the output together with aircraft specific data, to determine a load condition of the aircraft during loading operations.

In some embodiments, the data processing device is compact and lightweight, for example taking the form of a tablet computer, which is portable and easily handled by ground operations staff, for example together with one or more of the sensing devices described above. Embodiments are also relatively cost effective and convenient since no expensive and time consuming development or installation of complex on aircraft computer parts and systems is required in order to process sensor output from the landing gear. Still further, access to devices of the embodiments for ground operations personnel to operate and to maintain, is fast and convenient, and such devices are easily portable and stowable, for example to travel aboard a specific aircraft.

The data processing device is preferably operable to receive further output relating to a further sensed attribute of the or each strut, the attribute having a functional relationship with strut length, and to process the further output in determining the load condition of the aircraft. The further sensed attribute may comprise temperature at or adjacent the or each strut, the data processing device being operable to access an aircraft specific look up table or function to estimate a value for the load on the or each respective landing gear based on values relating to temperature and strut length. Taking strut related temperature into account facilitates more accurate load determination in some embodiments.

Preferably, the data processing device is operable to compute a value for at least one of the following load conditions:
 a. a load on the or each landing gear;
 b. a total weight on wheels of the aircraft;
 c. a position of a centre of gravity of the aircraft;
 d. a speed and direction of travel of a centre of gravity of the aircraft; and
 e. a rate of change of speed and direction of travel of a centre of gravity of the aircraft.

Preferably, the data processing device is further operable to compare at least one computed load condition value with a respective aircraft specific critical load condition value and to generate an alert signal if the comparison indicates an adverse condition. The alert signal may comprise at least one of the following:
 a. a signal for receipt by a display of the data processing device, or a remote display, to cause the display of a visual warning;
 b. a signal for receipt by an audio system of the data processing device, or a remote audio system, to cause an audible warning;
 c. a signal for receipt by a cargo loading system, to instruct an operator or machine to stop or reverse cargo loading operations;
 d. a signal for receipt by an on aircraft system accessible to flight crew, to provide visible or audible advice of the adverse condition.

In a still further aspect, the invention provides a method of determining a load condition of an aircraft in a loading operations position of a ground loading operations area comprising:
 a. mounting a sensing device relative to a strut of an aircraft landing gear, for example in a predetermined positional and/or configurational relationship with the strut;

b. using a processor to process output from the sensing device relating to strut length to provide a strut length related value;

c. using a processor to process aircraft specific data and/or further data relating to a further sensed attribute of the landing gear, together with the strut length related value, to provide a value for load on the landing gear; and d. demounting the sensor prior to the aircraft moving from the loading operations position.

Preferably, the further sensed attribute comprises temperature at or adjacent the strut, and the processor uses an aircraft specific look up table or function to determine a value for load on the landing gear based on computed values of temperature and strut length.

The method may comprise computing a value for at least one selected from the following load conditions:

a. a load on a landing gear;

b. respective loads on a plurality of respective landing gears each having a respective sensing device mounted thereto;

c. a total weight on wheels of the aircraft;

d. a position of a centre of gravity of the aircraft;

e. a speed and direction of travel of a centre of gravity of the aircraft; and f. a rate of change of speed and direction of travel of a centre of gravity of the aircraft.

The method may further comprise comparing at least one computed load condition value with a respective aircraft specific critical load condition value and to generate an alert signal if the comparison indicates an adverse condition.

The aircraft may be a commercial aircraft, for example a commercial passenger aircraft or cargo aircraft.

It will of course be appreciated that features described in relation to one aspect of the present invention may be incorporated into other aspects of the present invention. For example, the method of the invention may incorporate any of the features described with reference to the device of the invention and vice versa.

DESCRIPTION OF THE DRAWINGS

Embodiments of the present invention will now be described by way of example only with reference to the accompanying schematic drawings of which:

FIG. 2 is a perspective view showing portions of a known arrangement of an aircraft landing gear assembly, including a shock absorber assembly;

FIG. 3 is a front view of the arrangement of FIG. 2;

FIG. 6 is a side view of a sensing device according to an embodiment, mounted to a link mechanism of an aircraft landing gear;

FIG. 7 is a front view of the sensing device mounted to the link mechanism;

FIG. 8 is a perspective view of the sensing device, showing details of a sensing system of the device;

DETAILED DESCRIPTION

Figure 1:
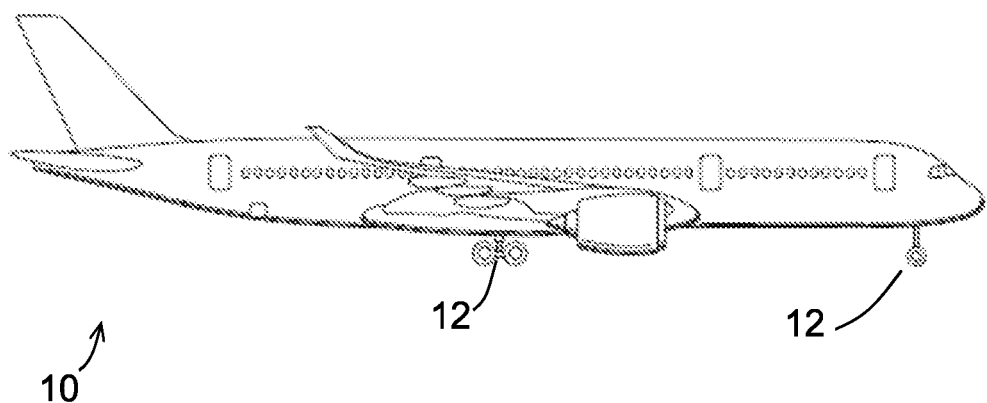
FIG. 1 shows a known aircraft having landing gear.

Aircraft landing gear assemblies typically include a shock absorber assembly (for example of the type referred to as an oleo strut) which provides suspension and shock absorbing functions for the aircraft during landing and take-off. An aircraft 10 including respective shock absorber assemblies 12 of main landing gear sets and a nose landing gear set is shown in FIG. 1. Portions of one such shock absorber assembly 12 are shown schematically in FIGS. 2 and 3 together with wheel bogie 11. Parts of the landing gear including, for example, the axles for mounting the wheels and the upper part of the landing gear for receiving the oleo strut, have been omitted from FIGS. 2 and 3 for the sake of clarity. The shock absorber assembly 12 comprises a piston 14 received within a cylinder 13. The cylinder 13 and piston 14 are connected via a link mechanism comprising links in the form of upper and lower link arms 17, 18. The links shown in FIGS. 2 and 3 are torque links, for inhibiting rotation of the piston 14 relative to the cylinder 13. The shock absorber assembly 12 typically includes one or more gas springs (not shown) with damping provided by hydraulic fluid (not shown) which can move between chambers (not shown) of the shock absorber assembly 12.

Figure 4:
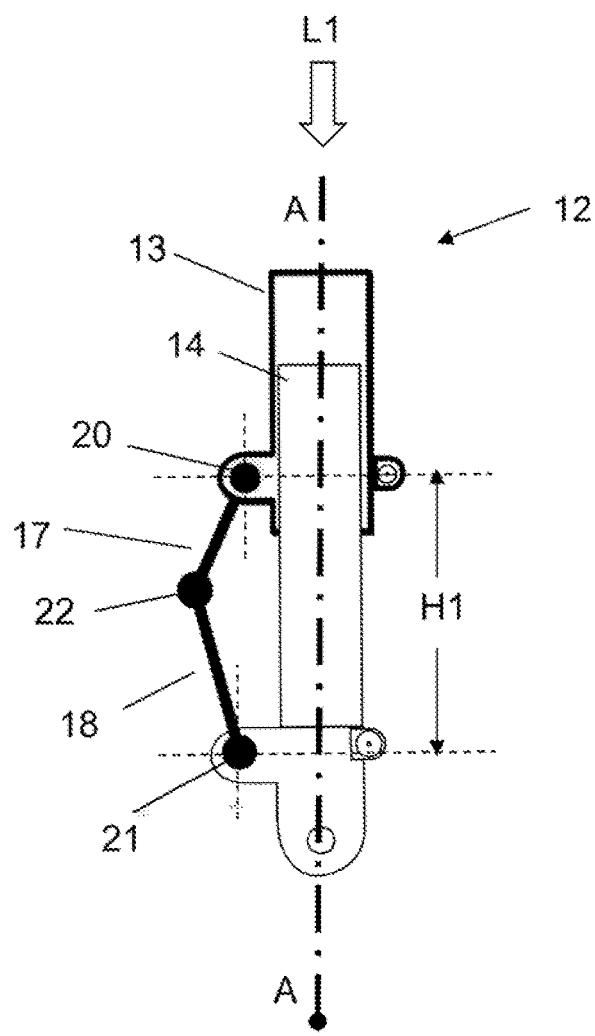
FIGS. 4 and 5 show a cross section through a shock absorber strut of the arrangement of FIGS. 2 and 3 under different load conditions.
Figure 5:
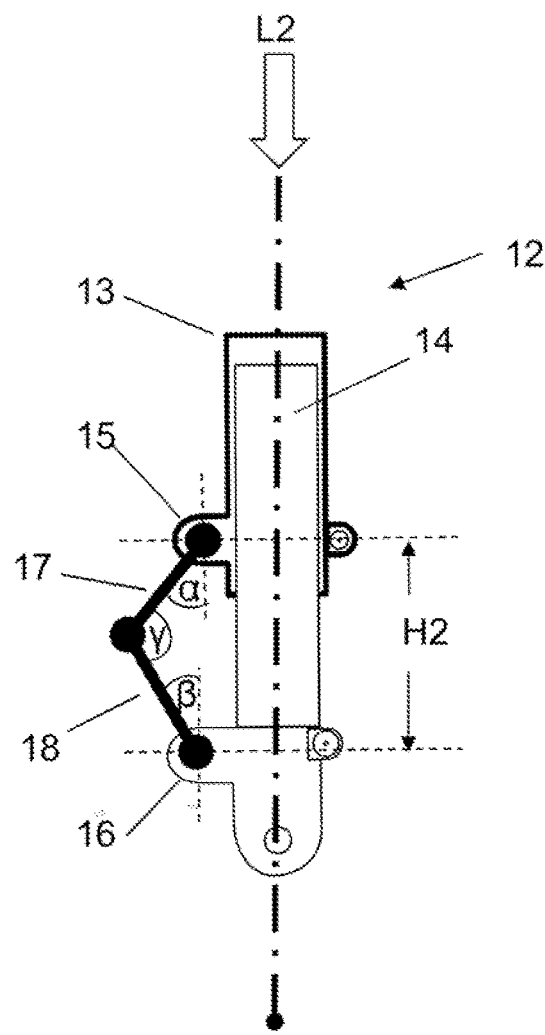

FIGS. 4 and 5 show part of the shock absorber assembly 12 in more detail, with the wheel bogie omitted, and showing details including respective upper and lower flanges 15, 16 which pivotally support the upper and lower link arms 17, 18 for rotation about pivot axes 20, 21. In FIG. 4, vertical loading on the strut due to aircraft weight is relatively light and the cylinder 13 rides higher on the piston 14 resulting in a longer overall length of the strut 13, 14. In FIG. 5, vertical loading on the strut due to aircraft weight is relatively high and the cylinder 13 rides lower on the piston 14 resulting in a shorter overall length of the strut 13, 14. The distance along a direction of a longitudinal axis L-L of the strut 13, 14 between a point fixed relative to the cylinder 13 and a point fixed relative to the piston 14, also referred to herein as compression, varies as a function of load.

FIGS. 4 and 5 show how the compression H1-H2 between pivot axis 20 of the upper link 17 relative to the cylinder 13 and pivot axis 21 of the lower link 18 relative to the piston 14 increases as load increases from L1 to L2. For a specific aircraft, the functional relationship between the load and the compression measured between a known point along the piston 14 and a known point along cylinder 13 can be established.

For a specific aircraft and landing gear set, the relationship can be established between strut compression and angular position and/or movement of one or both of the link arms 17, 18. Thus, by measuring at least one of the following angles, for example, the compression can be calculated: angle $\alpha$ of the upper link arm 17 relative to the strut axis A-A about pivot axis 20; angle $\beta$ of the lower link arm relative to strut axis A-A about the pivot axis 21; and/or angle $\gamma$ of the link arms 17, 18 relative to each other about their mutual pivot axis 22.

Sensing Device

Referring now to FIGS. 6 to 8, a sensing device 80 is shown according to an embodiment of the invention. The sensing device 80 comprises first and second members 87, 88 pivotally interconnected at first end portions thereof so as to pivot about a common pivot axis. As best shown in FIG. 8, sensing device 80 includes respective mount portions 81, 82 disposed at respective opposite end portions of the members 87, 88 for removably mounting each respective member 87, 88 directly to a respective link arm 17, 18 of the link mechanism of aircraft landing gear 12.

In the embodiment of FIGS. 6 to 8, the mount portions 81, 82 comprise quick release mounts 81, 82 each taking the form of a clip having a pair of opposed resilient arms 83, 84, 85, 86. The arms 83, 84, 85, 86 are adapted to resiliently grip a link arm 17, 18 to mount a respective member 87, 88 to a respective link arm 87, 88 for movement therewith. The sensing device 80 is adapted for use with a specific aircraft landing gear, such that during mounting each of the mount portions 81, 82 locates in a specific position with respect to a respective one of the link arms 17, 18, and the common pivot axis of the members 87, 88 of the sensing device 80 is in alignment with the pivot axis 22 of the link mechanism 17, 18 as shown in FIGS. 6 and 7. Thus, the angle between the members 87, 88 reflects the angle γ between the arms 17, 18 as the arms 17, 18 pivot due to changes in length of the strut 13, 14.

The mount portions 81, 82 facilitate mounting and demounting of the sensing device 80 to and from the link mechanism 17, 18 without undue delay, such that the sensing device 80 is mountable relative to the strut during loading operations and demountable after loading operations on the aircraft prior to the aircraft moving from the loading position. The arms 83, 84, 85, 86 of the quick release mounts 81, 82 may, for example, be formed of resilient plastics material, of metal, or any other suitable material. Many alternative forms of mount portion 81, 82 will be apparent to the ordinarily skilled person. For example, arms may be pivotally mounted on the members 87, 88 using sprung hinges (not shown), the mount portions 81, 82 may be magnetically attracted to the link arms 17, 18, and/or retaining straps or other fastenings (not shown) may be provided. Furthermore, a mount portion (not shown) may be provided at or close to the pivot axis of the sensing device.

As best shown in FIG. 8, the sensing device 80 comprises a sensing system 90 including a sensor 94 operable to sense a characteristic related to a length of the strut 13, 14. In the embodiment of FIGS. 6 to 8, the sensor 94 comprises an angular position sensor mounted at or close to the common pivot axis of the members 87, 88. The angular position sensor may be, for example, an inductive sensor such as a rotary variable differential transformer (RVDT), or any suitable alternative rotary transducer such as a rotary potentiometer or Hall Effect rotary position sensor. The sensor 94 in the present embodiment provides a digital output, but in alternative embodiments the output may be in the form of an analogue signal. The sensor 94 may also output the angular speed.

The sensing system 90 further comprises a processor 92, a memory 93, a communications interface 91 such as a network data interface, and optionally a temperature sensor 95. The processor 92 is connected for communication with the position sensor 94, temperature sensor 95, memory 93 and interface 91, and operable to receive data from the or each sensor 94, 95 and to store the received data in the memory 93. The processor 92, memory 93 and at least some of the other components 91, 94, 95 of the system 90 may be provided on a microchip, or integrated circuit. The system 90 further includes an electrical power supply (not shown) and the sensing device 80 may include a power source in the form of a battery (not shown) connected to the power supply. Suitable alternative power sources will be apparent to the ordinarily skilled reader, for example the power supply could connect to an external battery or AC power source.

The exemplary communications interface 91 comprises a wireless data interface, in the form of a short range wireless interface such as a Bluetooth compliant interface. Any suitable alternative wireless interface can be used, or alternatively wired interface technology.

With the sensing device 80 mounted in a specific position relative to the link arms and the pivot axis 22 of the link mechanism 17, 18 as described above, the position sensor 94 senses the angle γ between the link arms 17, 18 and provides the sensed output to the processor 92. The processor 92 is operable to process the output from the position sensor and to cause the communications interface 91 to transmit the processed output data for receipt by a data processing device operable to use the received output to determine a load condition of the aircraft during loading operations, as will be described in further detail below.

The temperature sensor 95 is provided on the sensing device 80 for sensing temperature at or adjacent the strut 13, 14. Preferably temperature sensor 95 is located closely adjacent to the strut cylinder 13, so as to facilitate close approximation of the measured temperature with the temperature experienced by fluids insider the cylinder 13. The processor 92 is operable to process output from the temperature sensor 95 and to cause the communications interface 91 to transmit the processed output data for receipt by the data processing device, described in further detail below. In alternative embodiments the temperature sensor 95 can send output directly to the processor of the data processing device 92. A temperature sensor can alternatively be located elsewhere, for example, in the data processing device 70 in direct communication with the processor 72, or on on-aircraft and received by the data processing device 70 over connection 57.

In an alternative embodiment (not shown), the mount portion 81 of the first member is adapted to be removably mountable the first link arm 17, and the mount portion 82 of the second member 88 is adapted to be removably mountable to the strut cylinder 13, so as to align the pivot axis of the sensing device 80 with the pivot axis 20 of the first link arm 17. Thus, the sensor 94 is operable to sense the angle α of the upper link arm 17 relative to the strut axis A-A about pivot axis 20.

In a further alternative embodiment (not shown), the mount portion 81 of the first member is adapted to be removably mountable the second link arm 18, and the mount portion 82 of the second member 88 is adapted to be removably mountable to the strut piston 14, so as to align the pivot axis of the sensing device 80 with the pivot axis 21 of the second link arm 18. Thus, the sensor 94 is operable to sense the angle β of the lower link arm relative to strut axis A-A about the pivot axis 21.

In a still further embodiment, an alternative sensing device (not shown) is provided that is operable to directly sense a longitudinal distance between a first location fixed for movement relative to the strut cylinder 13 and a second location fixed for movement relative to the strut piston 14. In one example, the position sensor 94 is a linear transducer such as a linear variable differential transformer (LVDT). The first end portions of the first and second members alternative sensing device are interconnected for linear movement, rather than pivotally interconnected, and mount portions are disposed at respective opposite end portions of the members for removably mounting each respective member in predetermined fixed relation to the strut cylinder 13 and strut piston 14 respectively. The mount portions facilitate mounting and demounting of the sensing device to and from the link mechanism without undue delay, such that the sensing device is mountable relative to the strut during loading operations and demountable after loading operations on the aircraft prior to the aircraft moving from the loading position. In a further example, the position sensor 94 comprises an optical sensor removably mounted in fixed relation to the cylinder 13 and/or piston 14, such that it can sense relative movement between the two.

Data Processing Device

Figure 9:
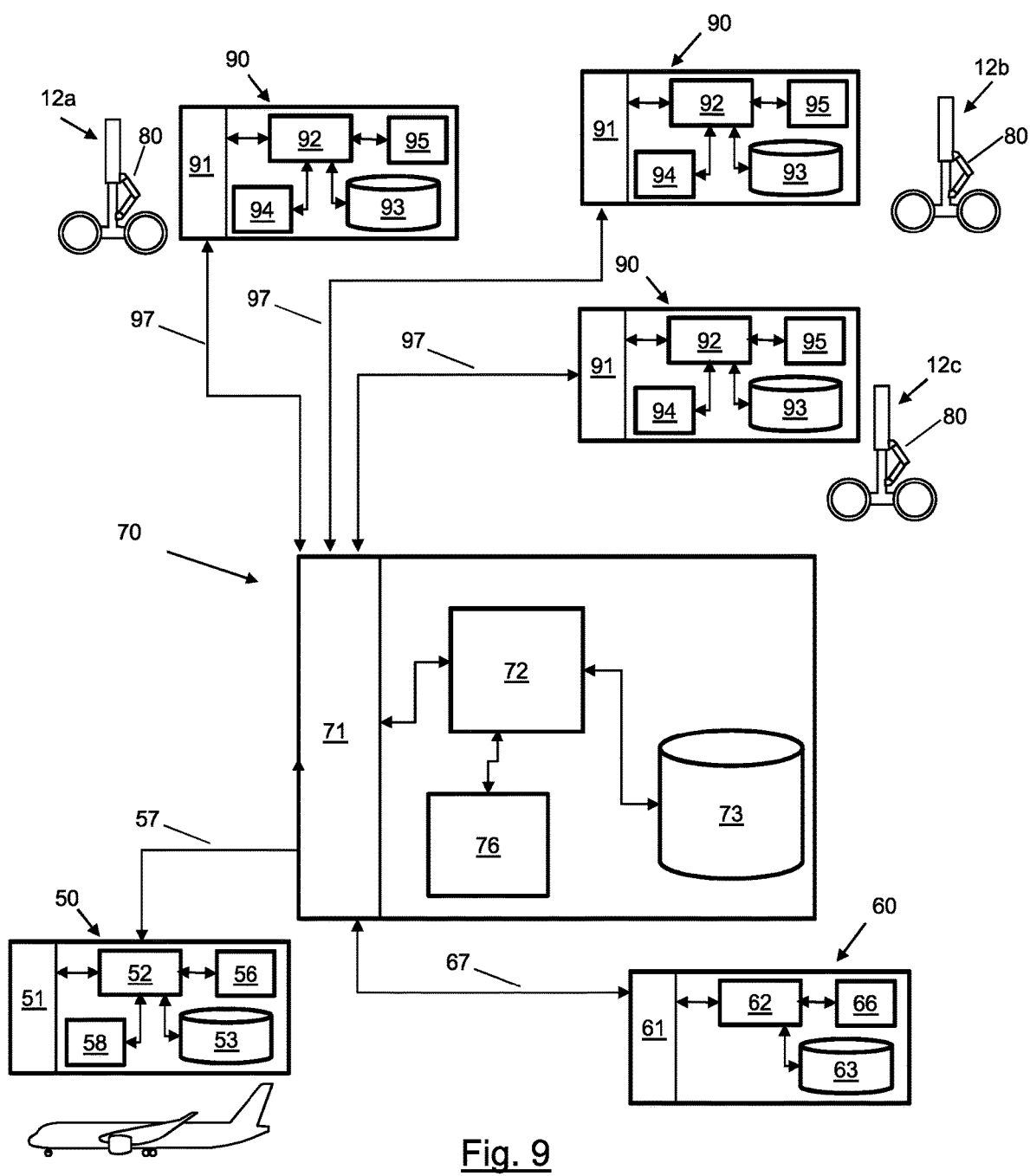
FIG. 9 shows a data processing device according to an embodiment, in communication with sensing devices mounted to respective landing gears.

FIG. 9 shows a data processing device 70, or computing device, comprising a communications interface such as a data interface 71, through which data can be sent or received, for example over a network. The data processing device 70 further comprises a processor 72 in communication with the data interface 71, and memory 73 in communication with the processor 72. The data processing device 70 is configured to receive data, such as signal data, image data, video data, or various data structures, via the data interface 71, and the processor 72 can store the received data in the memory 73, and process it so as to perform the methods such as those described herein, including processing signal data. The data processing device 70 further includes a user interface 76, including for example graphical and/or audio input and/or output interface components (not shown). The data processing device 70 may, for example, comprise a hand held computing device such as a tablet computer with touch screen, or any suitable alternative general purpose or custom computer device or system.

The data processing device 70 is operable to communicate via the communications interface 71 with a plurality of the sensing systems 90 of respective sensing devices 80 via the respective communications interfaces 91. Each of the sensing devices 80 is respectively mounted to a landing gear in the manner described above, in the form of a respective nose landing gear 12a, right main landing gear 12b and left main landing gear 12c of an aircraft. The communications interfaces 71, 91 are operable to set up respective connections 97 between each sensing system 90 and the data processing device 70. The connections 97 in the embodiment of FIG. 9 are wireless, in this case short range radio connections operating in accordance with a Bluetooth protocol or similar. However, the communications interfaces 71, 91 may additionally or alternatively be operable to form connections according to any alternative suitable form of protocol over either a wired or wireless connection. The connections may be established directly between communications interface 71 and the communications interface 91 of the or each sensing system 90, or may be established over a network and/or through intermediate devices.

The data processing device 70 is further operable to communicate via the communications interface 71 with an on aircraft computer system 50 via a communications interface 51 of the system 50. The communications interfaces 71, 51 are operable to set up a connection 57 between the on aircraft computer system 50 and the data processing device 70. The on aircraft computer system 50 comprises a processor 52 and a memory 53. The memory 53 stores data relating to the output of various on aircraft sensors 58, for example including a pitch attitude sensor. The connection 57 is wireless, and in alternative embodiments the communications interfaces 71, 51 may additionally or alternatively be operable to form connections according to any alternative suitable form of protocol over either a wired or wireless connection. The connection 57 may be established directly between communications interface 71 and the communications interface 51, or may be established over a network and/or through intermediate devices. The on aircraft computer system 50 further includes a user interface 56, including for example graphical, audio or other suitable input and/or output interface components (not shown) accessible from the aircraft cockpit.

The data processing device 70 is further operable to communicate via the communications interface 71 with a ground operations computer system 60 via a communications interface 61 of the system 60. The communications interfaces 71, 61 are operable to set up a connection 67 between the ground operations computer system 60 and the data processing device 70. The ground operations computer system 60 comprises a processor 62 and a memory 63. The memory 63 stores data relating to various ground operations, which may include for example flight manifest data and other aircraft load related data. The connection 67 is wireless, but the communications interfaces 71, 61 may additionally or alternatively be operable to form connections according to any alternative suitable form of protocol over either a wired or wireless connection. The connection 67 may be established directly between communications interface 71 and the communications interface 61, or may be established over a network and/or through intermediate devices. The ground operations computer system 60 further includes a user interface 66, including for example graphical, audio or other suitable input and/or output interface components (not shown) accessible to operations personnel.

The data processing device 70 is operable to receive output relating to the length of a strut 13, 14 of at least one aircraft landing gear 12a, 12b, 12c from a respective sensing device 80, and to process the output together with aircraft specific data, to determine a load condition of the aircraft during loading operations, as described in further detail below. The aircraft specific data is stored in memory 73, and enables the data processing device 70 to correlate the received strut length related output with the present load on the or each landing gear 12a, 12b, 12c. For example, the aircraft specific data correlates strut length related output in the form of measured values of an angle that varies according to a position of the link arms 17, 18 for a given aircraft and a given landing gear type, such as the angles $\alpha$, $\beta$, $\gamma$ described above, with respective load values on the landing gear. Alternatively, the aircraft specific data correlates a distance, for example directly measured values of a distance related to strut length as described above, or distance values computed using the measured values of angle $\alpha$, $\beta$, or $\gamma$, for a given aircraft and a given landing gear type, with respective load values on the landing gear.

The aircraft specific data may, for example, be based on empirical data or testing performed on the aircraft type or the specific aircraft for which the data is to be used, and may be stored in the memory 73 for example in the form of a look up table that directly correlates the measured angle or distance and a resulting load, or in any other conveniently accessible form. Alternatively, the aircraft specific data may be described by a function stored in memory 73, and the data processing device 70 may compute the landing gear load value from the measured input value of angle or distance. The received output from the sensors 94, 95 in the present embodiment is in digital form, but in some alternative embodiments may be an analogue signal based on output from the sensors 94, 95, which output is subsequently converted into digital form by the processing device 70.

In a further embodiment, for facilitating more accurate estimation of strut loading, the data processing device 70 is further operable to additionally receive further output from the or each respective sensing device 90 relating to a further sensed attribute of the or each strut 13, 14, and to process the further output together with the strut length related output in determining the load condition of the aircraft. The further sensed attribute has a functional relationship with strut length, and in the present embodiment comprises temperature at, or adjacent, the or each strut 13, 14. As is known in the art, the temperature of fluids within a strut cylinder 13 can significantly affect the strut length for a given load. Thus, taking strut temperature into account in estimating load on the strut facilitates a more accurate estimation of loading. The data processing device 70 is operable to access an enhanced aircraft specific look up table or matrix, or alternatively a function, that includes strut cylinder temperature, to estimate the value for the load on the or each respective landing gear based on the measured values relating to temperature and strut length.

An example table containing enhanced aircraft specific data is shown below as TABLE 1. The numerical values have been simplified to assist ready understanding of the principle. Table 1 below represents aircraft specific data showing a relationship between strut compression load, strut temperature measurement and the strut length related value (compression value). For a measured compression value and temperature, by looking up data in such a table, or performing a calculation using a mathematical function that expresses this relationship, an estimated value of the load on a landing gear is obtained by the processor 72.

TABLE 1

| Compression load | Temperature at strut | | |
|---|---|---|---|
| Compression value | −10° C. | 20° C. | 40° C. |
| 0 | 100 | 100 | 300 |
| 5 | 180 | 200 | 350 |
| 10 | 260 | 300 | 560 |
| 15 | 450 | 500 | 900 |
| 20 | 600 | 1000 | 1600 |
| 25 | 1500 | 2500 | 4000 |
| 30 | 4000 | 7000 | 9000 |

Further aircraft specific data stored in memory 73 relates, for example, to safety critical load condition values such as i) a location along the aircraft of the tail tipping point of the aircraft, at which if the centre of gravity of the aircraft moves to or aft of such point during loading operations the aircraft will tip onto its tail, and/or ii) a maximum safe operating distance for the centre of gravity aft of the leading edge of the mean aerodynamic chord, and/or iii) a maximum total allowable weight on wheels. Further aircraft specific data can be stored in memory, for example relating to pitch angle, the locations on the aircraft of the nose gear and main gear, and of the leading edge and length of the mean aerodynamic chord (MAC).

The data processing device 70, in one embodiment, is operable from time to time, for example at regular time intervals of 10 ms or 20 ms, or any other appropriate time interval, to receive output from the distance and temperature sensors 94, 95 and to compute a value for various load conditions of the aircraft. For example:
  a value for the load on each landing gear 12a, 12b, 12c is calculated using Table 1 as described above;
  the above-mentioned calculated values are summed to compute the total weight on wheels of the aircraft;
  the load values calculated above are used by the device 70 together with the aircraft specific landing gear positon data and, optionally, pitch attitude data to compute the position of the centre of gravity of the aircraft, which can for example be expressed as a percentage of MAC taken from the leading edge of MAC. Alternatively, the location of the centre of gravity can be calculated using one sensing device 80 mounted, for example, to the nose landing gear 12a, total weight on wheels data being obtained by, for example, i) estimating the weight based on flight manifest data and entering the estimated value into the memory 73 through the user interface 76, or ii) the data processing device 70 remotely accessing the weight value data from the on aircraft computer system 50 or the ground operations computer system 60;
  a speed and direction of travel of the centre of gravity of the aircraft; and/or
  a rate of change of the speed of the centre of gravity of the aircraft.

Processor 72 causes the computed values for the above-mentioned load conditions to be displayed on a display device of the user interface 76, and/or communicated to the on aircraft computer system 50 and/or ground operations computer system 60 for display, optionally together with the values relating to safety criteria. In this manner, operations personnel can monitor the position of the centre of gravity of the aircraft in close to real time.

The data processing device 70, in the present embodiment, is operable to compare at least one computed load condition value, with a respective aircraft specific critical load condition value and to generate an alert signal if the comparison indicates an adverse condition. The critical load condition value may be specified by operations personnel by inputting the value to memory 73 using the user interface 76. An adverse condition may arise for example if a critical load condition value is reached, or if the data processing device 70 determines that the computed load condition value is trending towards a critical load condition value such that the critical condition will be reached within a predetermined time period unless loading behaviour changes. For example, the comparison may relate to:
  a computed total weight on wheels and the maximum allowable total weight on wheels;
  a computed position of a centre of gravity of the aircraft and the longitudinal location of the tail tipping point; and/or
  a computed position of a centre of gravity of the aircraft and a maximum allowable extent along the MAC from the leading edge of the MAC.

In a preferred embodiment, the data processing device 70 monitors the computed load condition value against one or more tail tipping critical condition values stored in memory 73. In this example, the tail tipping critical condition values take the form of limit values for i) linear or angular distance and/or speed (or tendency) measured at the nose landing gear and/or ii) the centre of gravity position, for example the position aft of leading edge of MAC as a percentage of MAC. By monitoring the strut length data and rate of change of strut length data, the data processing device 70 can predict an impending breach of the limit values and generate an alert signal to pre-empt and/or enable prevention of a tail tip. Stored critical condition values may form part of a computer program pre-loaded to a data processing device 70 adapted for use with a specific aircraft, or specific aircraft type. The data processing device 70 may be for dedicated use for a specific aircraft and travel on board that aircraft for use in various locations. Optionally, the user may select the aircraft type from a menu presented over the computer interface 76 in order to cause the aircraft specific data, including critical condition values, for that aircraft type to be accessed by the data processing device 70. In some embodiments, critical condition values may be entered into memory 73 by ground operations personnel using the user interface 76, such entries being controlled for entering only by authorised personnel.

The alert signal comprises at least one of:
a. a signal for receipt by a display of the data processing device 70, or a remote display, to cause the display of a visual warning;
b. a signal for receipt by an audio system of the data processing device 70, or a remote audio system, to cause an audible warning;
c. a signal for receipt by a cargo loading system of the ground operations computer system 60 to instruct an operator or machine to stop or reverse cargo loading operations; and
d. a signal for receipt by an on aircraft system 50 accessible to flight crew, to provide visible or audible advice of the adverse condition.

Figure 10:
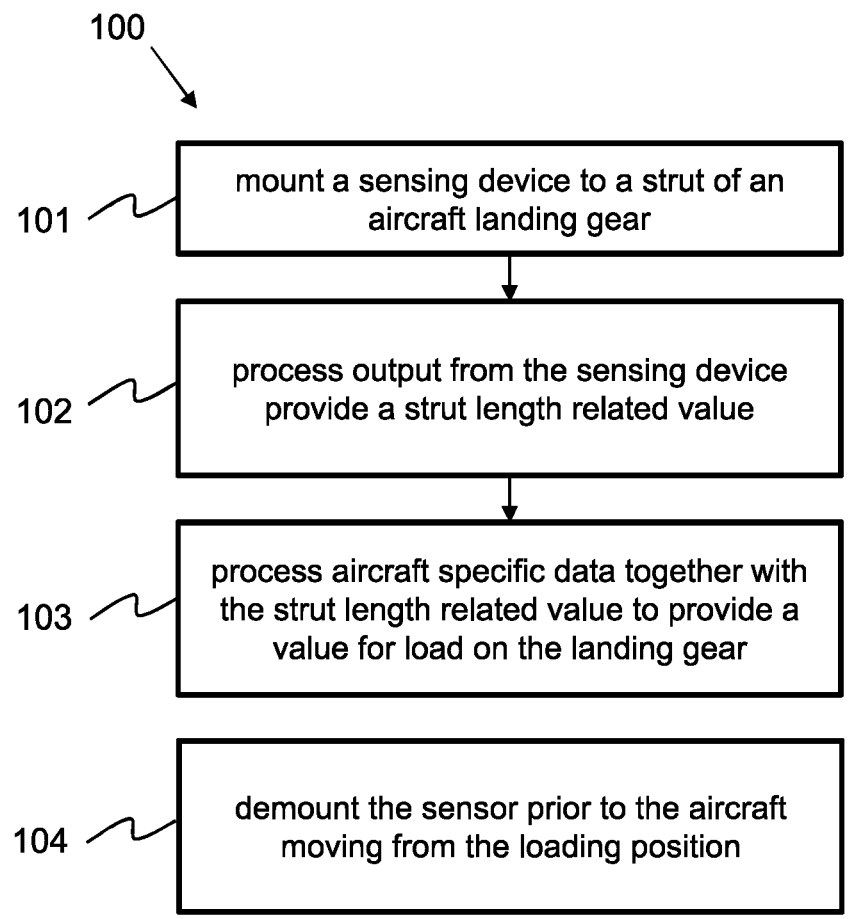
FIG. 10 is a flow diagram illustrating a method of determining a load condition of an aircraft according to an embodiment.

A method of determining a load condition of an aircraft in a loading operations position of a ground loading area will now be described with reference to FIG. 10. The method includes mounting a sensing device 80 relative to a strut 13, 14 of an aircraft landing gear 12; processing output from the sensing device 80 relating to strut length to provide a strut length related value; processing aircraft specific data and/or further data relating to a further sensed attribute of the landing gear, together with the strut length related value, to provide a value for load on the landing gear; and demounting the sensor prior to the aircraft moving from the loading operations position. The further sensed attribute in one embodiment comprises temperature at or adjacent the strut, and the processor 72 uses the aircraft specific look up table (Table 1), or a function, to determine a value for load on the landing gear 12 based on computed values of temperature and strut length. The computed load condition value may be, for example: a load on a landing gear; respective loads on a plurality of respective landing gears each having a respective sensing device mounted thereto; a total weight on wheels of the aircraft; a position of a centre of gravity of the aircraft; a speed and direction of travel of a centre of gravity of the aircraft; and/or a rate of change of speed and direction of travel of a centre of gravity of the aircraft. At least one computed load condition value is compared with an aircraft specific critical load condition value to generate an alert signal if the comparison indicates an adverse condition.

Each device, module, component, machine or function as described in relation to any of the examples described herein may comprise a processor and/or processing system or may be comprised in device comprising a processor and/or processing system. One or more aspects of the embodiments described herein comprise processes performed by device. In some examples, the device comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

Whilst the present invention has been described and illustrated with reference to particular embodiments, it will be appreciated by those of ordinary skill in the art that the invention lends itself to many different variations not specifically illustrated herein. For example, in some embodiments some or all components of the data processing device 70 may be included in the sensing device, and/or components such as the processor and/or memory of the sensing device and of the data processing device may be provided in common and shared between the sensing device and the data processing device.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A sensing device, comprising:
   a sensor operable to sense a characteristic related to a length of a strut of a landing gear of an aircraft, the device being mountable relative to the strut during loading operations and demountable after loading operations prior to the aircraft moving from the loading operations position,
   the sensing device being operable to provide an output relating to the sensed characteristic for receipt by a data processing device operable to use the received output to determine a load condition of the aircraft during loading operations,
   wherein the sensor is operable to sense an angle between first and second link arms of a link mechanism of the landing gear about a common pivot axis, the sensing device comprising first and second pivotally interconnected members, respective mount portions of the members being adapted to be removably mountable to the link mechanism so as to align a pivot axis of the sensing device with the common pivot axis of the first and second arms, and
   wherein the sensing device further comprises first and second members pivotally interconnected at end portions thereof, wherein respective opposite end portions of the members comprise respective quick release mount portions for removably mounting the members directly to respective link arms of the link mechanism.

2. A sensing device according to claim 1, comprising a further sensor for sensing temperature at or adjacent the strut, the sensing device operable to provide a further output relating to the sensed temperature for receipt by the data processing device.

3. A sensing device according to claim 1, further comprising a processor and a memory, the processor being in communication with the or each sensor and the memory, the processor being operable to receive data from the or each sensor and to store the received data in the memory.

4. A sensing device according to claim 1, further comprising a communications interface for communicating sensed output to the data processing device, the communications interface comprising a wireless data interface.

5. A sensing device according to claim 1, operable to sense a longitudinal distance between a first location fixed for movement relative to a strut cylinder and a second location fixed for movement relative to a strut piston.

6. A sensing device according to claim 1, further comprising at least one of a rotary transducer, linear transducer, optical sensor.

7. A sensing device, comprising: a sensor operable to sense a characteristic related to a length of a strut of a landing gear of an aircraft, the device being mountable relative to the strut during loading operations and demountable after loading operations prior to the aircraft moving from the loading operations position, the sensing device being operable to provide an output relating to the sensed characteristic for receipt by a data processing device operable to use the received output to determine a load condition of the aircraft during loading operations, wherein the sensor is operable to sense an angle between i) a first and/or second link arm of a link mechanism of the landing gear and ii) a longitudinal axis of the strut, the sensing device comprising first and second pivotally interconnected members, respective mount portions of the members being adapted to be removably mountable respectively to i) the first or second link arm and ii) to the strut, so as to align a pivot axis of the sensing device with a pivot axis of the first or second link arm.

8. A sensing device according to claim 7, the sensing device comprising first and second members pivotally interconnected at end portions thereof, wherein respective opposite end portions of the members comprise respective quick release mount portions for removably mounting the members respectively i) to the first or second link arm and ii) relative to a cylinder or piston of the strut.

9. A data processing device comprising a processor and a memory, the device operable to:
receive output relating to the length of a strut of at least one aircraft landing gear from at least one respective sensing device according to claim 1.

10. A data processing device according to claim 9, operable to receive further output relating to a further sensed attribute of the or each strut, the attribute having a functional relationship with strut length, and to process the further output in determining the load condition of the aircraft.

11. A data processing device according to claim 9, wherein the further sensed attribute comprises temperature at or adjacent the or each strut, and the data processing device is operable to access an aircraft specific look up table or function to estimate a value for the load on the or each respective landing gear based on values relating to temperature and strut length.

12. A data processing device according to claim 9, operable to compute a value for at least one of the following load conditions:
 a. a load on the or each landing gear;
 b. a total weight on wheels of the aircraft;
 c. a position of a centre of gravity of the aircraft;
 d. a speed and direction of travel of a centre of gravity of the aircraft; and
 e. a rate of change of speed and direction of travel of a centre of gravity of the aircraft.

13. A data processing device according to claim 12, operable to compare at least one computed load condition value with a respective aircraft specific critical load condition value and to generate an alert signal if the comparison indicates an adverse condition.

14. A data processing device according to claim 13, wherein the alert signal comprises at least one of the following:
 a. a signal for receipt by a display of the data processing device, or a remote display, to cause the display of a visual warning;
 b. a signal for receipt by an audio system of the data processing device, or a remote audio system, to cause an audible warning;
 c. a signal for receipt by a cargo loading system, to instruct an operator or machine to stop or reverse loading operations; and
 d. a signal for receipt by an on aircraft system accessible to flight crew, to provide visible or audible advice of the adverse condition.

15. A method of determining a load condition of an aircraft in a loading operations position of a ground loading operations area comprising:
 a. mounting the sensing device according to claim 1 relative to the strut of the aircraft landing gear;
 b. using a processor to process output from the sensing device relating to strut length to provide a strut length related value;
 c. using a processor to process aircraft specific data and/or further data relating to a further sensed attribute of the landing gear, together with the strut length related value, to provide a value for load on the landing gear; and
 d. demounting the sensor prior to the aircraft moving from the loading operations position.

16. A method according to claim 15, wherein the further sensed attribute comprises temperature at or adjacent the strut, and the processor uses an aircraft specific look up table or function to determine a value for load on the landing gear based on computed values of temperature and strut length.

17. A method according to claim 15, further comprising computing a value for at least one selected from the following load conditions:
 a. a load on a landing gear;
 b. respective loads on a plurality of respective landing gears each having a respective sensing device mounted thereto;
 c. a total weight on wheels of the aircraft;
 d. a position of a centre of gravity of the aircraft;
 e. a speed and direction of travel of a centre of gravity of the aircraft; and
 f. a rate of change of speed and direction of travel of a centre of gravity of the aircraft.

18. A method according to claim 17, further comprising comparing at least one computed load condition value with a respective aircraft specific critical load condition value and to generate an alert signal if the comparison indicates an adverse condition.

* * * * *